(12) United States Patent
Kaniganti et al.

(10) Patent No.: US 11,956,385 B2
(45) Date of Patent: Apr. 9, 2024

(54) SYSTEMS AND METHODS FOR UTILIZING A MACHINE LEARNING MODEL TO DETERMINE AN INTENT OF A VOICE CUSTOMER IN REAL TIME

(71) Applicant: Verizon Patent and Licensing Inc., Basking Ridge, NJ (US)

(72) Inventors: Srinivasa Kaniganti, Frisco, TX (US); Madhu Talupur, Princeton, NJ (US); Sankar Shanmugam, Dayton, NJ (US); Amol Chakradeo, Martinsville, NJ (US); Rajeshkhanna Singa Ramalingam, Dayton, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/931,603

(22) Filed: Sep. 13, 2022

(65) Prior Publication Data

US 2024/0089372 A1 Mar. 14, 2024

(51) Int. Cl.
*H04M 3/493* (2006.01)
*H04M 3/53* (2006.01)

(52) U.S. Cl.
CPC ......... *H04M 3/493* (2013.01); *H04M 3/5307* (2013.01); *H04M 2203/1058* (2013.01)

(58) Field of Classification Search
CPC ............... H04M 3/493; H04M 3/5307; H04M 2203/1058; H04M 3/5183; G06N 20/00; G06N 3/08; G06N 3/045; G06N 5/022; G06N 3/006
See application file for complete search history.

(56) References Cited

U.S. PATENT DOCUMENTS

| | | | |
|---|---|---|---|
| 10,204,343 B2* | 2/2019 | Chang | G06Q 30/016 |
| 10,827,064 B2* | 11/2020 | Segalis | H04M 3/42093 |
| 11,076,047 B1* | 7/2021 | Clodore | G06Q 10/0639 |
| 11,461,667 B2* | 10/2022 | Bell | H04L 51/02 |
| 11,734,648 B2* | 8/2023 | Li | G06F 18/2113 |
| | | | 705/1.1 |
| 2015/0302475 A1* | 10/2015 | Zachariah | G06Q 30/0267 |
| | | | 705/14.57 |
| 2019/0281159 A1* | 9/2019 | Segalis | H04M 3/4936 |
| 2020/0304441 A1* | 9/2020 | Bradley | G06N 3/045 |
| 2021/0374671 A1* | 12/2021 | Li | G10L 15/26 |
| 2022/0121776 A1* | 4/2022 | Johnston | G06F 21/554 |
| 2022/0366427 A1* | 11/2022 | Stoops | G06N 5/022 |

(Continued)

FOREIGN PATENT DOCUMENTS

CA 3167955 A1 * 9/2021 ......... G06Q 10/0639

*Primary Examiner* — Akelaw Teshale

(57) ABSTRACT

A device may receive real time audio data associated with a call between an agent and a customer, and may receive customer data identifying historical interactions with the customer. The device may receive chat data associated with the customer or interactive voice response (IVR) data associated with the customer, and may generate, based on the real time audio data, transcript data identifying a real time transcript of the call with the customer. The device may process the real time audio data, the customer data, the chat data or the IVR data, and the transcript data, with a machine learning model, to determine a customer intent and one or more actions to perform based on the customer intent; and may perform the one or more actions.

20 Claims, 8 Drawing Sheets

(56) References Cited

U.S. PATENT DOCUMENTS

2023/0057877 A1\* 2/2023 DiMaria ............... H04L 67/306
2023/0199118 A1\* 6/2023 Koneru ............... H04M 3/4936
379/88.01

\* cited by examiner

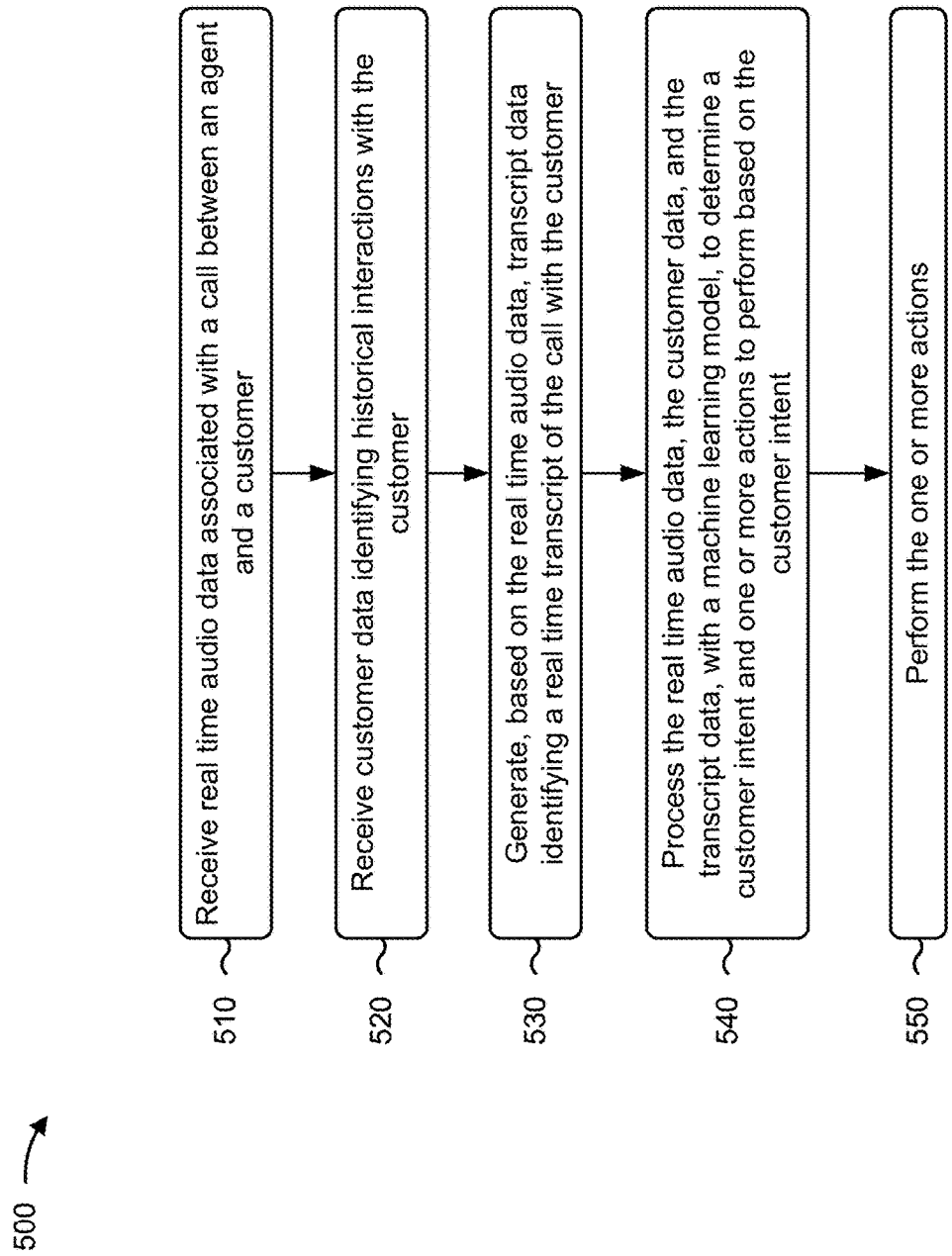

SYSTEMS AND METHODS FOR UTILIZING A MACHINE LEARNING MODEL TO DETERMINE AN INTENT OF A VOICE CUSTOMER IN REAL TIME

BACKGROUND

A call center is a managed capability that can be centralized or remote and is used for receiving or transmitting a large volume of inquiries by telephone. An inbound call center is operated by an entity to administer incoming product or service support or information inquiries from consumers.

BRIEF DESCRIPTION OF THE DRAWINGS

FIG. 5 is a flowchart of an example process for utilizing a machine learning model to determine an intent of a voice customer in real time.

DETAILED DESCRIPTION OF EXAMPLE EMBODIMENTS

Figure 1A:
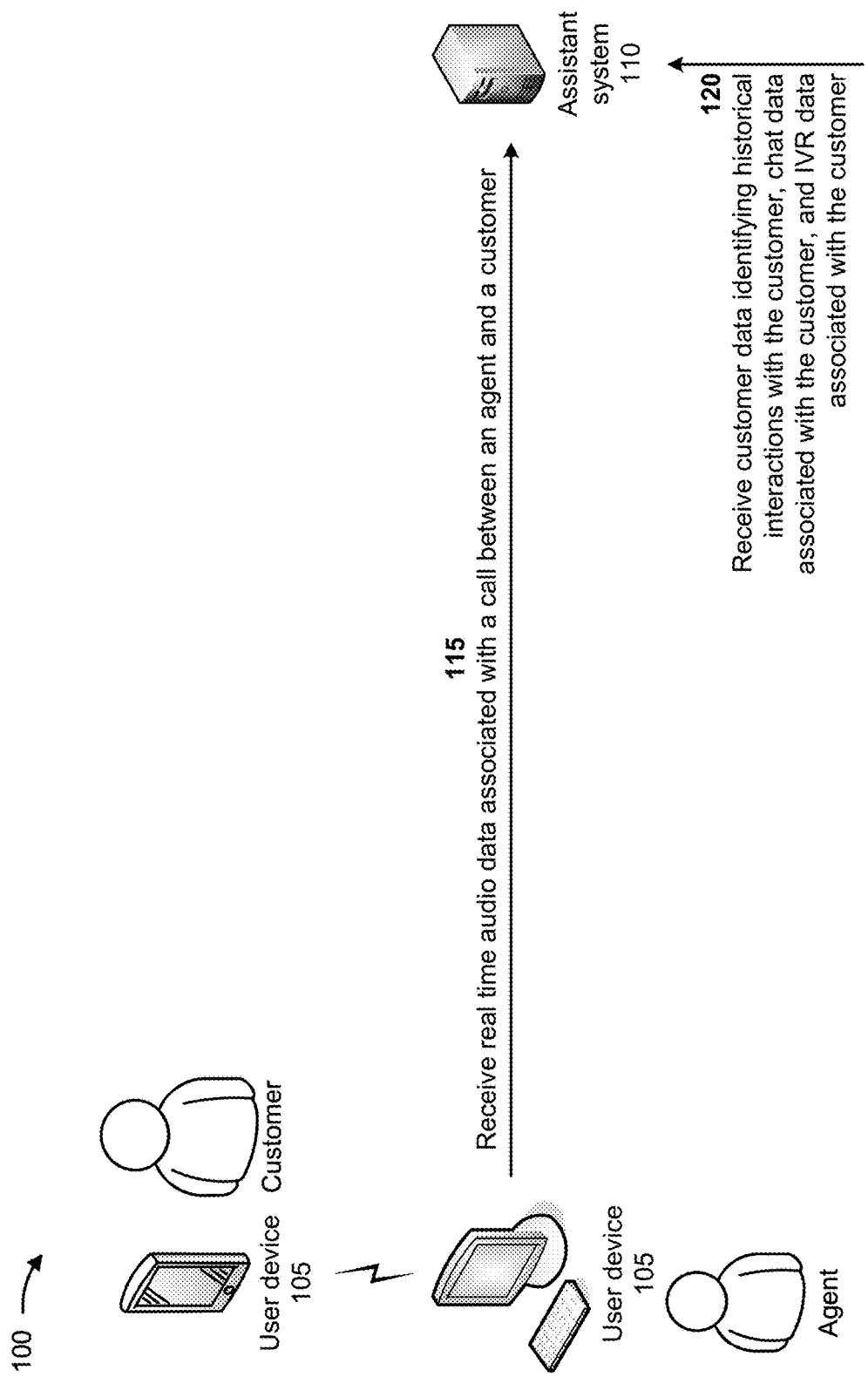
FIGS. 1A-1D are diagrams of an example associated with utilizing a machine learning model to determine an intent of a voice customer in real time.

The following detailed description of example implementations refers to the accompanying drawings. The same reference numbers in different drawings may identify the same or similar elements.

A call center agent may conduct calls with customers that involve the agent answering questions from the customers. However, the agent may need to research different information from various sources and/or tools to answer the questions from the customers. Researching the information to answer questions consumes resources, consumes time of the agent, and creates a poor experience for the customers waiting for answers. Thus, current techniques for handling call center calls consume computing resources (e.g., processing resources, memory resources, communication resources, and/or the like), networking resources, and/or other resources associated with creating a poor customer experience for customers, accessing resources to determine answers to customer questions, failing to determine answers to customer questions before the customers end calls, failing to complete transactions for customers in a timely manner, losing sales of products and/or services due to failing to answer customer questions, and/or the like.

Some implementations described herein provide an assistant system that utilizes a machine learning model to determine an intent of a voice customer in real time. For example, the assistant system may receive real time audio data associated with a call between an agent and a customer, and may receive customer data identifying historical interactions with the customer. The assistant system may receive chat data associated with the customer or interactive voice response (IVR) data associated with the customer, and may generate, based on the real time audio data, transcript data identifying a real time transcript of the call with the customer. The assistant system may process the real time audio data, the customer data, the chat data or the IVR data, and the transcript data, with a machine learning model, to determine a customer intent and one or more actions to perform based on the customer intent; and may perform the one or more actions.

In this way, the assistant system utilizes a machine learning model to determine an intent of a voice customer in real time. For example, the assistant system may assist call center agents to answer customer questions and to complete customer transactions in a timely manner. The assistant system may reduce average call handling times and may reduce training times for any upcoming changes in a call center system. The assistant system may listen in on calls between an agent and a customer, and may utilize a machine learning model to determine a customer intent and actions to perform based on the customer intent. Thus, the assistant system may conserve computing resources, networking resources, and/or other resources that would have otherwise been consumed by creating a poor customer experience for customers, accessing resources to determine answers to customer questions, failing to determine answers to customer questions before the customers end calls, failing to complete transactions for customers in a timely manner, losing sales of products and/or services due to failing to answer customer questions, and/or the like.

FIGS. 1A-1D are diagrams of an example 100 associated with utilizing a machine learning model to determine an intent of a customer in real time. As shown in FIGS. 1A-1D, example 100 includes user devices 105 associated with an assistant system 110. One user device 105 may be associated with an agent, and the other user device 105 may be associated with a customer. Further details of the user device 105 and the assistant system 110 are provided elsewhere herein.

As shown in FIG. 1A, and by reference number 115, the assistant system 110 may receive real time audio data associated with a call between the agent and the customer. For example, the agent and the customer may utilize the user devices 105 to conduct a voice call associated with the customer in real time. In some implementations, the voice call may be associated with a transaction of the customer with an entity (e.g., a company, a government agency, and/or the like) associated with the agent, one or more products offered by the entity, one or more services offered by the entity, an account of the customer with the entity, and/or the like. The voice call may generate the real time audio data associated with the call, and the assistant system 110 may receive the audio data in real time from the user devices 105 associated with the agent and the customer. In some implementations, if the call between the agent and the customer is a video call, the assistant system 110 may capture the video data and the audio data associated with the video call in real time. In some implementations, the assistant system 110 may continuously receive the audio data from the user devices 105 in real time for a duration of the call between the agent and the customer.

As further shown in FIG. 1A, and by reference number 120, the assistant system 110 may receive customer data identifying historical interactions with the customer, chat data associated with the customer, and IVR data associated with the customer. For example, the assistant system 110 may be associated with a data structure (e.g., a database, a table, a list, and/or the like) that stores the customer data. The assistant system 110 may receive the customer data from the data structure. The customer data may include data identifying an account of the customer with the entity, historical transactions of the customer with the entity, historical transcripts of previous calls by the customer with the entity, historical products of the entity viewed and/or purchased by the customer, historical services of the entity viewed and/or purchased by the customer, applications utilized for the customer by the entity for the previous calls, and/or the like.

In some implementations, prior to the voice call with the agent, the customer may be involved in a chat session with a chatbot of the entity and/or a chat agent of the entity, via a system (e.g., a website, a portal, and/or the like) associated with the entity. In some implementations, the system of the entity may be the assistant system 110. The system may store (e.g., in a data structure) the chat data input during the chat session with the customer, and the assistant system 110 may receive the chat data from the data structure associated with the system. The chat data may include data identifying text input by the customer and/or the chat agent during the chat session, audio input by the customer and/or the chat agent during the chat session, video input by the customer and/or the chat agent during the chat session, applications utilized for the customer by the entity for the chat session, and/or the like.

In some implementations, prior to the voice call with the agent, the customer may be involved in an IVR session with an IVR system of the entity. In some implementations, the IVR system of the entity may be the assistant system 110. The IVR system may store (e.g., in a data structure) the IVR data input during the IVR session with the customer, and the assistant system 110 may receive the IVR data from the data structure associated with the IVR system. The IVR data may include data identifying text input by the customer and/or the IVR system during the IVR session, audio input by the customer and/or the IVR system during the IVR session, applications utilized for the customer by the entity for the IVR session, and/or the like.

Figure 1B:
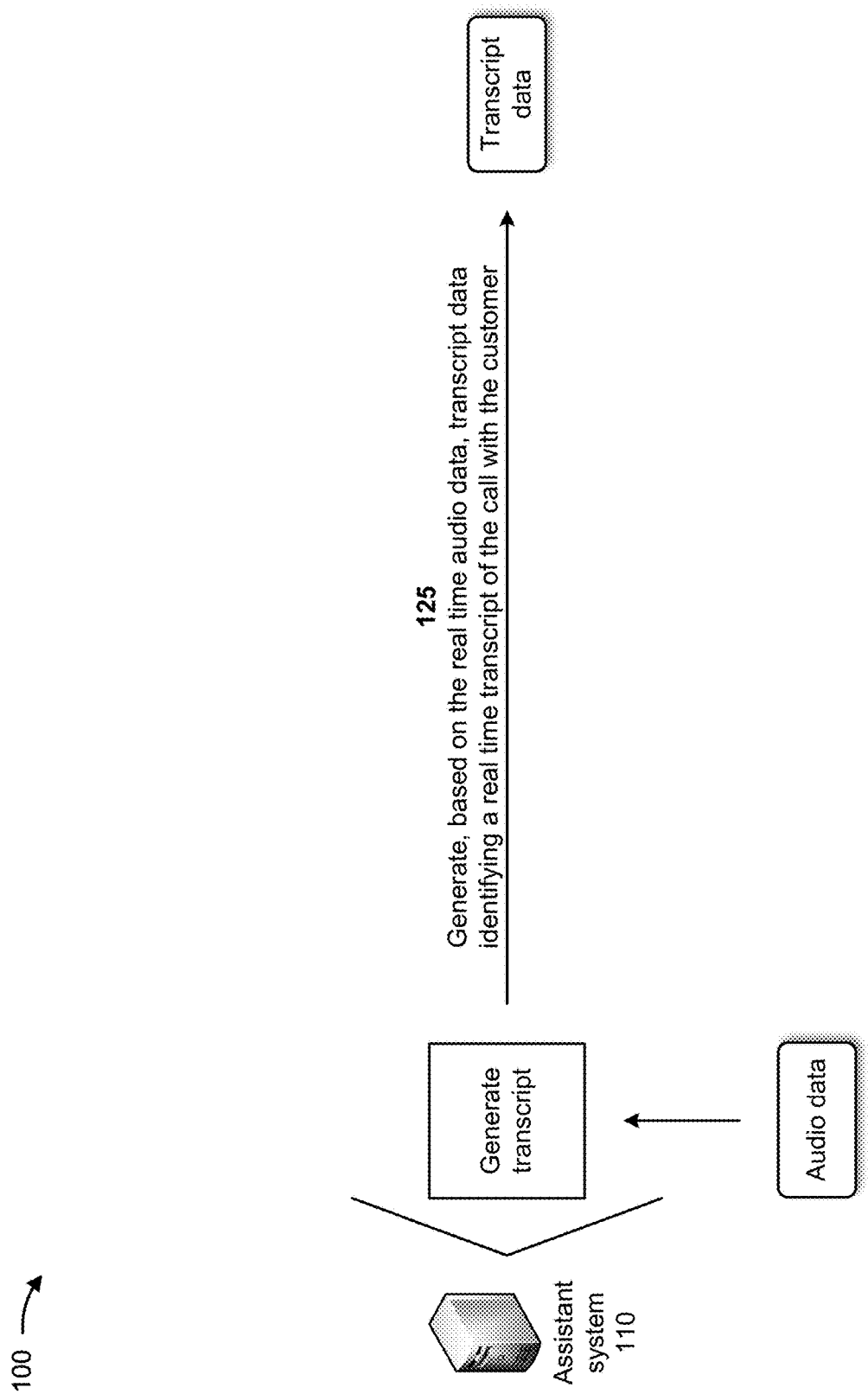

As shown in FIG. 1B, and by reference number 125, the assistant system 110 may generate, based on the real time audio data, transcript data identifying a real time transcript of the call with the customer. For example, the assistant system 110 may convert the real time audio data into textual data that corresponds to the transcript data identifying the real time transcript of the call with the customer. In some implementations, when generating, based on the real time audio data, the transcript data identifying the real time transcript of the call with the customer, the assistant system 110 may process the real time audio data, with a real time speech analysis model, to generate the transcript data identifying the real time transcript of the call with the customer.

In some implementations, the real time speech analysis model may include an automatic speech recognition model, a computer speech recognition model, a speech-to-text model, and/or the like. The real time speech analysis model may enable recognition and translation of spoken language, from the real time audio data, into textual data that corresponds to the transcript data identifying the real time transcript of the call with the customer. In some implementations, the real time speech analysis model may include a hidden Markov model, a dynamic time warping-based speech model, a deep feed-forward neural network model, a deep recurrent neural network model, an end-to-end automatic speech recognition model, and/or the like.

Figure 1C:
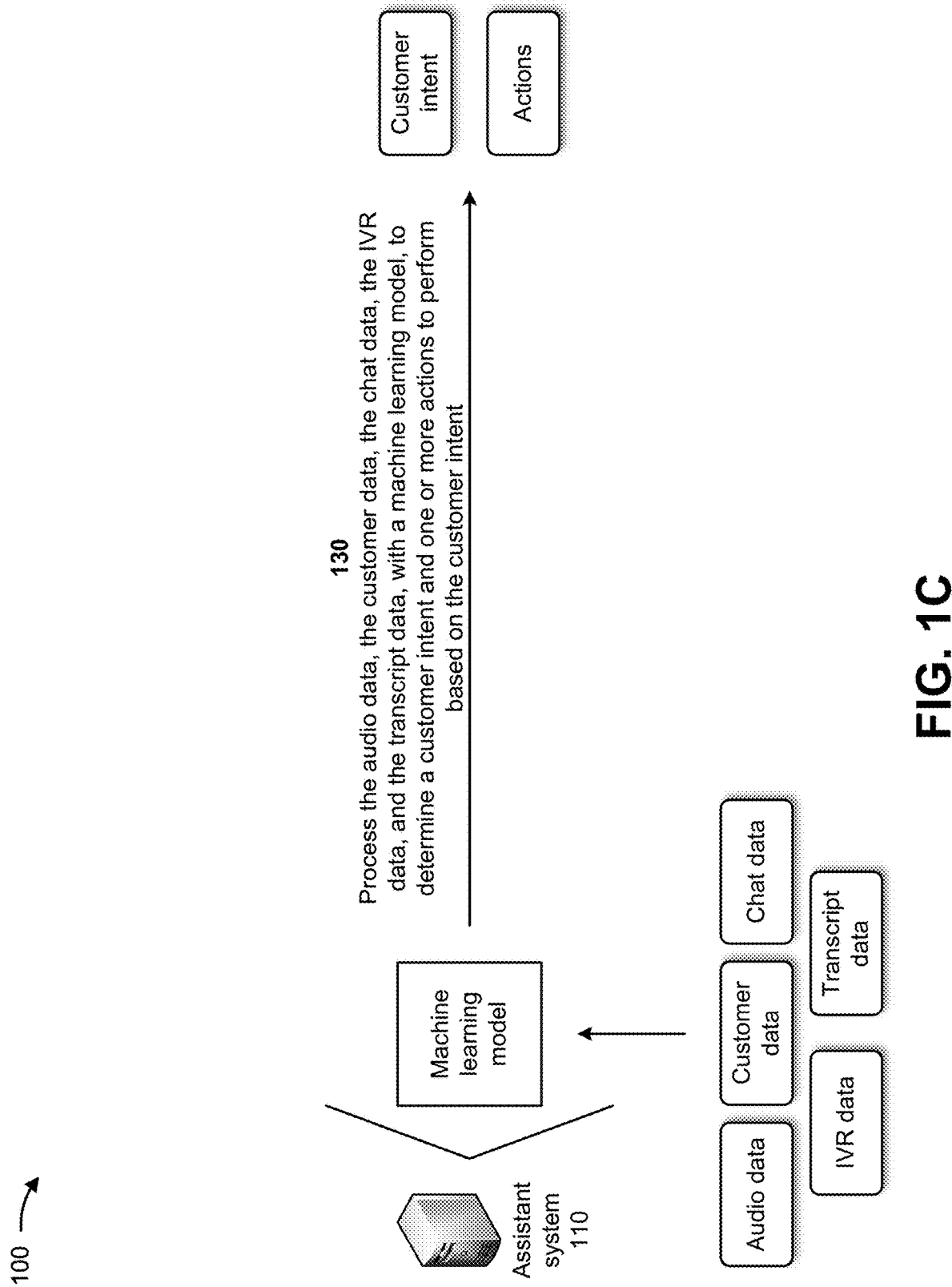

As shown in FIG. 1C, and by reference number 130, the assistant system 110 may process the audio data, the customer data, the chat data, the IVR data, and the transcript data, with a machine learning model, to determine a customer intent and one or more actions to perform based on the customer intent. For example, the assistant system 110 may be associated with one or more machine learning models, such as a natural language processing (NLP) machine learning model, a sentiment analysis machine learning model, and/or the like. In some implementations, the assistant system 110 may store and maintain the one or more machine learning models, may access the one or more machine learning models from another device, and/or the like. The NLP machine learning model may process natural language as it is spoken (e.g., the real time audio data) or written (e.g., the real time transcript data) to analyze, understand, and derive meaning from the natural language in a useful way. In some implementations, the NLP machine learning model may include a probabilistic language model, a neural network-based language model, and/or the like.

The sentiment analysis machine learning model may include a naïve Bayesian machine learning model, a linear regression machine learning model, a support vector machine learning model, a deep learning model, and/or the like. In some implementations, the assistant system 110 may utilize the sentiment analysis machine learning model to generate a sentiment graph based on the audio data, the customer data, the chat data, the IVR data, and/or the transcript data. The sentiment graph may include a graph, a chart, and/or the like that provides an indication of sentiments (e.g., emotions) of the customer and/or the agent during the voice call, the chat session, the IVR session, and/or the like.

In some implementations, the assistant system 110 may preprocess the audio data, the customer data, the chat data, the IVR data, and the transcript data prior to processing such data with the machine learning model. For example, the assistant system 110 may utilize tokenization to break down text into smaller units, and may utilize stop word removal to remove common words from text so that unique words that offer the most information about the text remain. The assistant system 110 may utilize lemmatization and stemming to reduce words of text to root forms, and may utilize part-of-speech tagging to mark words of text based on a part-of speech of the words (e.g., nouns, verbs, or adjectives).

In some implementations, the assistant system 110 may process the audio data, the customer data, the chat data, the IVR data, and the transcript data, with the machine learning model, to determine an intent of the customer (e.g., the customer intent). The customer intent may include thoughts directing the customer's decisions and/or actions toward a particular event (e.g., a transaction, a support question, and/or the like). For example, the customer intent may include an intent of the customer to purchase a product from the entity, purchase a service from the entity, learn more about a product and/or a service of the entity, receive support for a product and/or a service of the entity, and/or the like.

In some implementations, the assistant system 110 may process the audio data, the customer data, the chat data, the IVR data, and the transcript data, with the machine learning model, to determine the one or more actions to perform based on the customer intent. For example, the one or more actions may include providing the transcript data for display to the agent in real time, generating an in-line chat flow to complete a transaction with the customer and providing the in-line chat flow for display to the agent, identifying applications to complete a transaction with the customer and providing the agent with access to the applications, providing a link to an answer for a customer question, generating one or more options based on the customer intent and providing the one or more options for display to the agent, automatically populating a communication with customer information and providing the populated communication to the agent, generating a customer greeting and providing the customer greeting for display to the agent, retraining the machine learning model based on the customer intent and/or results associated with performance of the one or more actions, and/or the like. Further details of the one or more actions are provided below in connection with FIG. 1D. Further details of the machine learning model are provided below in connection with FIG. 2.

Figure 1D:
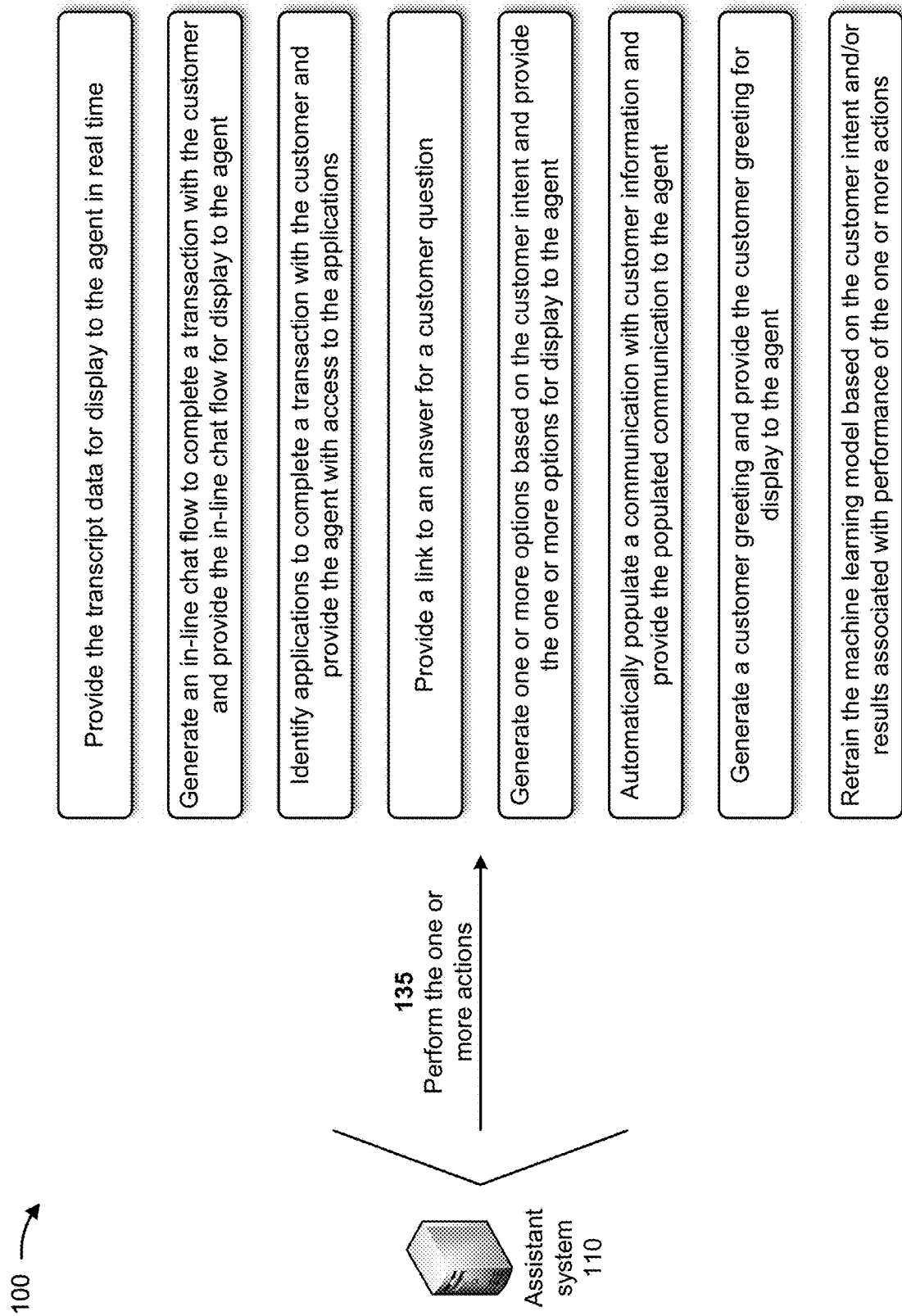

As shown in FIG. 1D, and by reference number 135, the assistant system 110 may perform the one or more actions. In some implementations, performing the one or more actions includes the assistant system 110 providing the transcript data for display to the agent in real time. For example, the assistant system 110 may continuously provide the transcript data identifying the real time transcript of the call with the customer to the user device 105 associated with the agent, and the user device 105 may provide the transcript data for display to the agent in real time. In some implementations, the assistant system 110 may generate and continuously update the sentiment graph. The assistant system 110 may continuously provide the sentiment graph to the user device 105 associated with the agent, and the user device 105 may display the sentiment graph to the agent in real time. The real time transcript and/or the sentiment graph may enable the agent to determine whether the customer is satisfied, whether the agent is addressing the customer's questions, whether the customer is frustrated, and/or the like. In this way, the assistant system 110 conserves computing resources, networking resources, and/or other resources that would have otherwise been consumed by creating a poor customer experience for customers.

In some implementations, performing the one or more actions includes the assistant system 110 generating an in-line chat flow to complete a transaction with the customer and providing the in-line chat flow for display to the agent. For example, the assistant system 110 may determine based on the customer intent that the customer wishes to complete a transaction for a product or a service of the entity. The assistant system 110 may generate an in-line chat flow to complete the transaction with the customer. The in-line chat flow may include text identifying steps for the agent to perform to complete the transaction with the customer (e.g., instruct the customer to add the product or the service to a shopping cart, instruct the customer to proceed to checkout, and/or the like). The assistant system 110 may provide the in-line chat flow to the user device 105 associated with the agent, and the user device 105 may display the in-line chat flow to the agent. The agent may utilize the in-line chat flow to complete the transaction with the customer in a timely manner. In this way, the assistant system 110 conserves computing resources, networking resources, and/or other resources that would have otherwise been consumed by failing to complete transactions for the customers in a timely manner.

In some implementations, performing the one or more actions includes the assistant system 110 identifying applications to complete a transaction with the customer and providing the agent with access to the applications. For example, the assistant system 110 may determine based on the customer intent that the customer wishes to complete a transaction for a product or a service of the entity. The assistant system 110 may identify one or more applications to utilize for completing the transaction with the customer. The one or more applications may include an application for creating an account with the entity, an application for providing customer billing information, an application for viewing features of the product or the service, and/or the like. The assistant system 110 may provide the user device 105 associated with the agent with access to the one or more applications, and the agent may utilize the one or more applications to complete the transaction for the customer. In some implementations, the assistant system 110 may determine when it is appropriate to perform a search for the one or more applications, and may perform the search for the one or more applications at an appropriate time. The assistant system 110 may provide results of the search (e.g., access information for the one or more applications) to the user device associated with the agent, and the user device 105 may display the search results to the agent. In this way, the assistant system 110 conserves computing resources, networking resources, and/or other resources that would have otherwise been consumed by losing sales of products and/or services due to failing to complete transactions.

In some implementations, performing the one or more actions includes the assistant system 110 providing a link to an answer for a customer question. For example, the assistant system 110 may detect, based on at least one of the real time audio data, the customer data, and the transcript data, a customer question associated with a product or a service of the entity, and may perform a search for an answer to the customer question. The assistant system 110 may identify a link for the answer to customer question, and may provide the link to the user device 105 associated with the agent. The user device 105 may display the link to the agent, and may receive a selection of the link by the agent. Selection of the link may cause the user device 105 to display the answer to the customer question to the agent. The agent may convey the answer to the customer in a timely manner. In some implementations, the assistant system 110 may determine when it is appropriate to perform a search for the answer, and may perform the search for the answer at an appropriate time. The assistant system 110 may provide results of the search (e.g., links to answers) to the user device associated with the agent, and the user device 105 may display the search results to the agent. In this way, the assistant system 110 conserves computing resources, networking resources, and/or other resources that would have otherwise been consumed by failing to determine answers to customer questions before the customers end calls.

In some implementations, performing the one or more actions includes the assistant system 110 generating one or more options based on the customer intent and providing the one or more options for display to the agent. For example, the assistant system 110 may determine based on the customer intent that the customer wishes to be provided one or more options for a product or a service (e.g., the customer speaking to the agent about setting up automatic payments). The assistant system 110 may search for and determine the one or more options for the product or the service based on the search. The assistant system 110 may provide the one or more options to the user device 105 associated with the agent, and the user device 105 may display the options to the agent. The agent may describe the one or more options to the customer so that customer may select an option. In this way, the assistant system 110 conserves computing resources, networking resources, and/or other resources that would have otherwise been consumed by losing sales of products and/or services due to failing to answer customer questions.

In some implementations, performing the one or more actions includes the assistant system 110 automatically populating a communication with customer information and providing the populated communication to the agent. For example, the assistant system 110 may determine based on the customer intent that the customer requires a communication (e.g., an email message, a text message, and/or the like) associated with a product or a service. The assistant system 110 may automatically generate and populate the communication with customer information to generate a populated communication, and may provide the populated communication to the user device 105 associated with the agent. The user device 105 may display the populated communication to the agent and the agent may cause the populated communication to be provided to the user device 105 associated with the customer. The populated communication may include information that enables the agent to complete a transaction with the customer. In this way, the assistant system 110 conserves computing resources, networking resources, and/or other resources that would have otherwise been consumed by failing to complete transactions for the customers in a timely manner.

In some implementations, performing the one or more actions includes the assistant system 110 generating a customer greeting and providing the customer greeting for display to the agent. For example, if the customer utilized an IVR system prior to the call with the agent, the assistant system 110 may determine an initial reason for the call from the IVR data. In such an example, the assistant system 110 may generate a customer greeting that includes the reason for the call, and may provide the customer greeting to the user device 105 associated with the agent. The user device 105 may display the customer greeting to the agent and the agent may utilize the customer greeting when speaking with the customer. In another example, if the customer has previously interacted with the call center or a chat session, the assistant system 110 may determine, based on the previous call or the chat data, that the customer is a returning customer and a reason that the customer previously interacted with the entity. In such an example, the assistant system 110 may generate a customer greeting that includes the reason that the customer previously interacted with the entity, and may provide the customer greeting to the user device 105 associated with the agent. The user device 105 may display the customer greeting to the agent and the agent may utilize the customer greeting when speaking with the customer. In this way, the assistant system 110 conserves computing resources, networking resources, and/or other resources that would have otherwise been consumed by creating a poor customer experience for customers.

In some implementations, performing the one or more actions includes the assistant system 110 retraining the machine learning model based on the customer intent and/or results associated with performance of the one or more actions. For example, the assistant system 110 may utilize the customer intent and/or the results associated with performance of the one or more actions as additional training data for retraining the machine learning model, thereby increasing the quantity of training data available for training the machine learning model. Accordingly, the assistant system 110 may conserve computing resources associated with identifying, obtaining, and/or generating historical data for training the machine learning model relative to other systems for identifying, obtaining, and/or generating historical data for training machine learning models.

In some implementations, performing the one or more actions includes the assistant system 110 detecting the customer sentiment based on the customer intent. The assistant system 110 may generate a recommendation that the call be transferred to a manager based on the customer sentiment, and may provide the recommendation for display to the agent (e.g., via the user device 105). Alternatively, the assistant system 110 may automatically transfer the call to the manager based on the customer sentiment (e.g., indicating that the customer is clearly upset and the agent is failing to address an issue or is ignoring the recommended actions provided by the assistant system 110).

In some implementations, if the customer is ordering something, performing the one or more actions includes the assistant system 110 causing an order for the customer to be automatically scheduled for delivery. For example, the assistant system 110 may automatically schedule a product for delivery to the customer, may automatically schedule a technician to travel to the customer's location and perform a service, may perform an action associated with fulfilling the order, and/or the like.

In some implementations, performing the one or more actions includes the assistant system 110 determining a performance of the agent over time, and automatically scheduling additional customer service training for the agent when the performance of the agent fails to satisfy a threshold performance level.

In this way, the assistant system 110 utilizes a machine learning model to determine an intent of a voice customer in real time. For example, the assistant system 110 may assist call center agents to answer customer questions and to complete customer transactions in a timely manner. The assistant system 110 may reduce average call handle times and may reduce training times for any upcoming changes in a call center system. The assistant system 110 may listen in on calls between an agent and a customer, and may utilize a machine learning model to determine a customer intent and actions to perform based on the customer intent. Thus, the assistant system 110 may conserve computing resources, networking resources, and/or other resources that would have otherwise been consumed by creating a poor customer experience for customers, accessing resources to determine answers to customer questions, failing to determine answers to customer questions before the customers end calls, failing to complete transactions for the customers in a timely manner, losing sales of products and/or services due to failing to answer customer questions, and/or the like.

As indicated above, FIGS. 1A-1D are provided as an example. Other examples may differ from what is described with regard to FIGS. 1A-1D. The number and arrangement of devices shown in FIGS. 1A-1D are provided as an example. In practice, there may be additional devices, fewer devices, different devices, or differently arranged devices than those shown in FIGS. 1A-1D. Furthermore, two or more devices shown in FIGS. 1A-1D may be implemented within a single device, or a single device shown in FIGS. 1A-1D may be implemented as multiple, distributed devices. Additionally, or alternatively, a set of devices (e.g., one or more devices) shown in FIGS. 1A-1D may perform one or more functions described as being performed by another set of devices shown in FIGS. 1A-1D.

Figure 2:
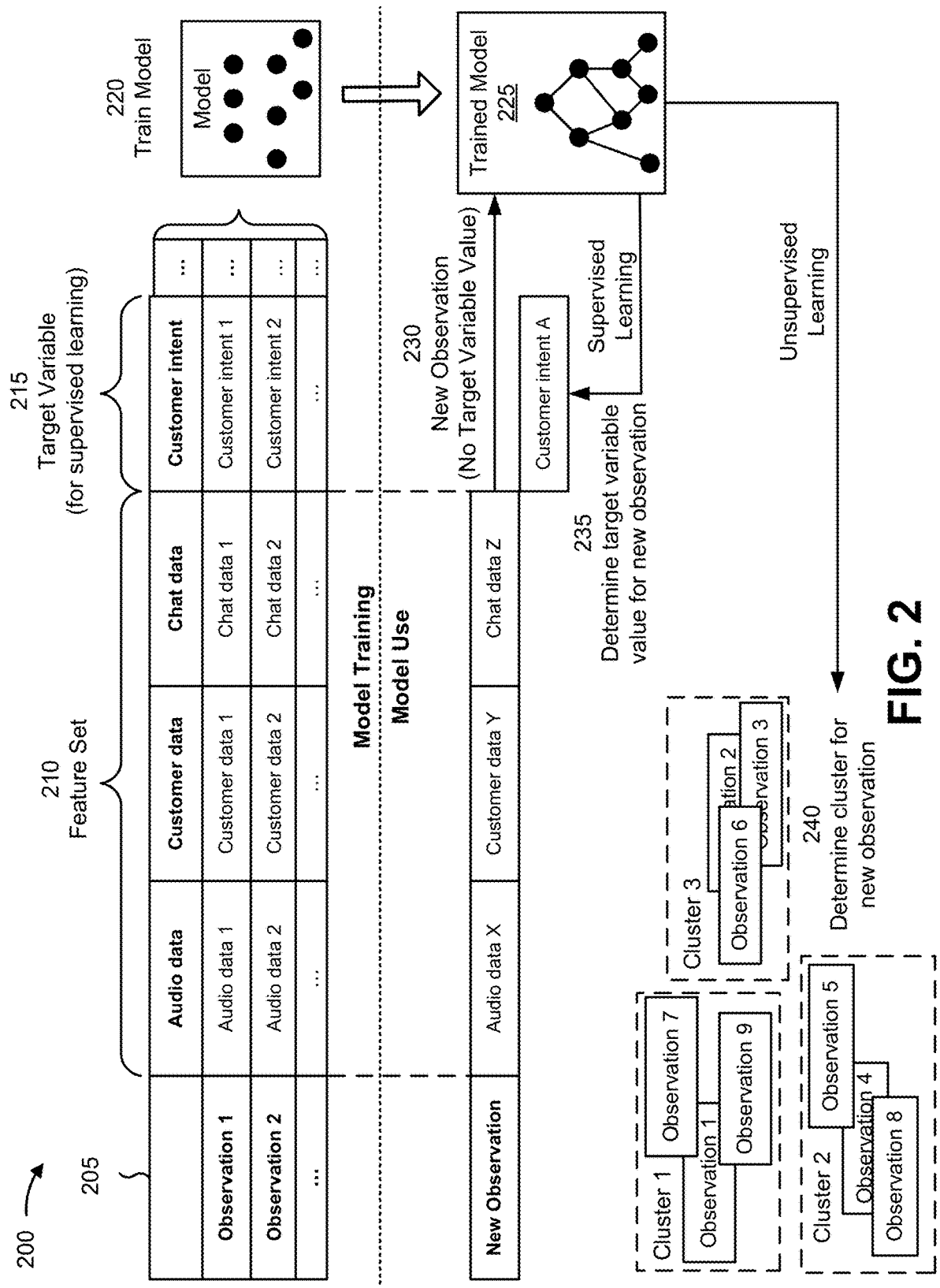
FIG. 2 is a diagram illustrating an example of training and using a machine learning model.

FIG. 2 is a diagram illustrating an example 200 of training and using a machine learning model to determine an intent of a voice customer in real time. The machine learning model training and usage described herein may be performed using a machine learning system. The machine learning system may include or may be included in a computing device, a server, a cloud computing environment, and/or the like, such as the assistant system 110 described in more detail elsewhere herein.

As shown by reference number 205, a machine learning model may be trained using a set of observations. The set of observations may be obtained from historical data, such as data gathered during one or more processes described herein. In some implementations, the machine learning system may receive the set of observations (e.g., as input) from the assistant system 110, as described elsewhere herein.

As shown by reference number 210, the set of observations includes a feature set. The feature set may include a set of variables, and a variable may be referred to as a feature. A specific observation may include a set of variable values (or feature values) corresponding to the set of variables. In some implementations, the machine learning system may determine variables for a set of observations and/or variable values for a specific observation based on input received from the assistant system 110. For example, the machine learning system may identify a feature set (e.g., one or more features and/or feature values) by extracting the feature set from structured data, by performing natural language processing to extract the feature set from unstructured data, by receiving input from an operator, and/or the like.

As an example, a feature set for a set of observations may include a first feature of audio data, a second feature of customer data, a third feature of chat data, and so on. As shown, for a first observation, the first feature may have a value of audio data 1, the second feature may have a value of customer data 1, the third feature may have a value of chat data 1, and so on. These features and feature values are provided as examples and may differ in other examples.

As shown by reference number 215, the set of observations may be associated with a target variable. The target variable may represent a variable having a numeric value, may represent a variable having a numeric value that falls within a range of values or has some discrete possible values, may represent a variable that is selectable from one of multiple options (e.g., one of multiple classes, classifications, labels, and/or the like), may represent a variable having a Boolean value, and/or the like. A target variable may be associated with a target variable value, and a target variable value may be specific to an observation. In example 200, the target variable may be labelled "customer intent" and may include a value of "customer intent 1" for the first observation.

The target variable may represent a value that a machine learning model is being trained to predict, and the feature set may represent the variables that are input to a trained machine learning model to predict a value for the target variable. The set of observations may include target variable values so that the machine learning model can be trained to recognize patterns in the feature set that lead to a target variable value. A machine learning model that is trained to predict a target variable value may be referred to as a supervised learning model.

In some implementations, the machine learning model may be trained on a set of observations that do not include a target variable. This may be referred to as an unsupervised learning model. In this case, the machine learning model may learn patterns from the set of observations without labeling or supervision, and may provide output that indicates such patterns, such as by using clustering and/or association to identify related groups of items within the set of observations.

As shown by reference number 220, the machine learning system may train a machine learning model using the set of observations and using one or more machine learning algorithms, such as a regression algorithm, a decision tree algorithm, a neural network algorithm, a k-nearest neighbor algorithm, a support vector machine algorithm, and/or the like. After training, the machine learning system may store the machine learning model as a trained machine learning model 225 to be used to analyze new observations.

As shown by reference number 230, the machine learning system may apply the trained machine learning model 225 to a new observation, such as by receiving a new observation and inputting the new observation to the trained machine learning model 225. As shown, the new observation may include a first feature of audio data X, a second feature of customer data Y, a third feature of chat data Z, and so on, as an example. The machine learning system may apply the trained machine learning model 225 to the new observation to generate an output (e.g., a result). The type of output may depend on the type of machine learning model and/or the type of machine learning task being performed. For example, the output may include a predicted value of a target variable, such as when supervised learning is employed. Additionally, or alternatively, the output may include information that identifies a cluster to which the new observation belongs, information that indicates a degree of similarity between the new observation and one or more other observations, and/or the like, such as when unsupervised learning is employed.

As an example, the trained machine learning model 225 may predict a value of customer intent A for the target variable of the customer intent for the new observation, as shown by reference number 235. Based on this prediction, the machine learning system may provide a first recommendation, may provide output for determination of a first recommendation, may perform a first automated action, may cause a first automated action to be performed (e.g., by instructing another device to perform the automated action), and/or the like.

In some implementations, the trained machine learning model 225 may classify (e.g., cluster) the new observation in a cluster, as shown by reference number 240. The observations within a cluster may have a threshold degree of similarity. As an example, if the machine learning system classifies the new observation in a first cluster (e.g., an audio data cluster), then the machine learning system may provide a first recommendation. Additionally, or alternatively, the machine learning system may perform a first automated action and/or may cause a first automated action to be performed (e.g., by instructing another device to perform the automated action) based on classifying the new observation in the first cluster.

As another example, if the machine learning system were to classify the new observation in a second cluster (e.g., a customer data cluster), then the machine learning system may provide a second (e.g., different) recommendation and/or may perform or cause performance of a second (e.g., different) automated action.

In some implementations, the recommendation and/or the automated action associated with the new observation may be based on a target variable value having a particular label (e.g., classification, categorization, and/or the like), may be based on whether a target variable value satisfies one or more thresholds (e.g., whether the target variable value is greater than a threshold, is less than a threshold, is equal to a threshold, falls within a range of threshold values, and/or the like), may be based on a cluster in which the new observation is classified, and/or the like.

In this way, the machine learning system may apply a rigorous and automated process to determine an intent of a voice customer in real time. The machine learning system enables recognition and/or identification of tens, hundreds, thousands, or millions of features and/or feature values for tens, hundreds, thousands, or millions of observations, thereby increasing accuracy and consistency and reducing delay associated with determining an intent of a voice customer in real time relative to requiring computing resources to be allocated for tens, hundreds, or thousands of operators to manually determine an intent of a voice customer in real time.

As indicated above, FIG. 2 is provided as an example. Other examples may differ from what is described in connection with FIG. 2.

Figure 3:
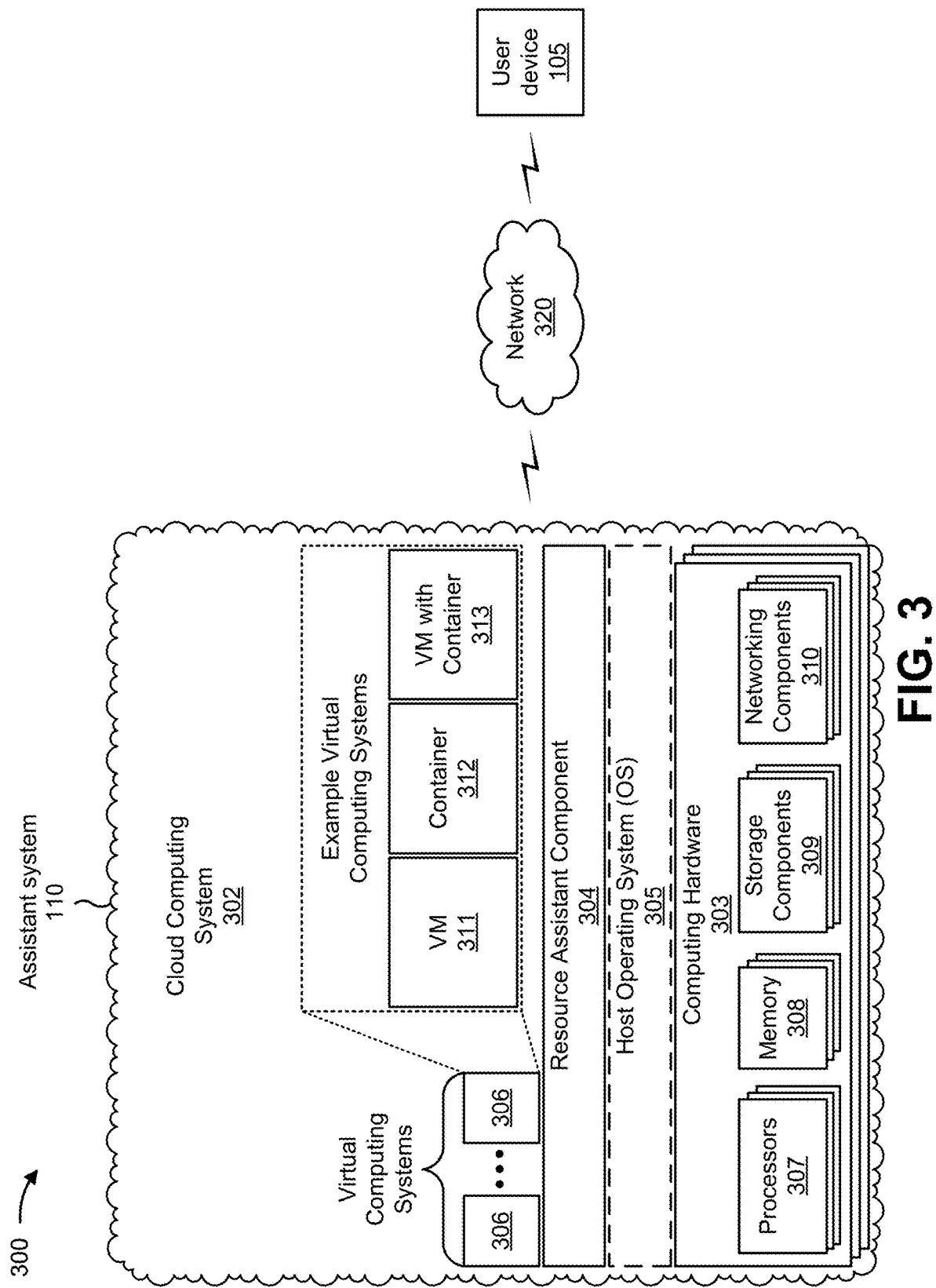
FIG. 3 is a diagram of an example environment in which systems and/or methods described herein may be implemented.

FIG. 3 is a diagram of an example environment 300 in which systems and/or methods described herein may be implemented. As shown in FIG. 3, the environment 300 may include the assistant system 110, which may include one or more elements of and/or may execute within a cloud computing system 302. The cloud computing system 302 may include one or more elements 303-313, as described in more detail below. As further shown in FIG. 3, the environment 300 may include the user device 105 and/or a network 320. Devices and/or elements of the environment 300 may interconnect via wired connections and/or wireless connections.

The user device 105 includes one or more devices capable of receiving, generating, storing, processing, and/or providing information, such as information described herein. For example, the user device 105 can include a mobile phone (e.g., a smart phone or a radiotelephone), a laptop computer, a tablet computer, a desktop computer, a handheld computer, a gaming device, a wearable communication device (e.g., a smart watch or a pair of smart glasses), a mobile hotspot device, a fixed wireless access device, customer premises equipment, an autonomous vehicle, or a similar type of device.

The cloud computing system 302 includes computing hardware 303, a resource management component 304, a host operating system (OS) 305, and/or one or more virtual computing systems 306. The cloud computing system 302 may execute on, for example, an Amazon Web Services platform, a Microsoft Azure platform, or a Snowflake platform. The resource management component 304 may perform virtualization (e.g., abstraction) of the computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from the computing hardware 303 of the single computing device. In this way, the computing hardware 303 can operate more efficiently, with lower power consumption, higher reliability, higher availability, higher utilization, greater flexibility, and lower cost than using separate computing devices.

The computing hardware 303 includes hardware and corresponding resources from one or more computing devices. For example, the computing hardware 303 may include hardware from a single computing device (e.g., a single server) or from multiple computing devices (e.g., multiple servers), such as multiple computing devices in one or more data centers. As shown, the computing hardware 303 may include one or more processors 307, one or more memories 308, one or more storage components 309, and/or one or more networking components 310. Examples of a processor, a memory, a storage component, and a networking component (e.g., a communication component) are described elsewhere herein.

The resource management component 304 includes a virtualization application (e.g., executing on hardware, such as the computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 311. Additionally, or alternatively, the resource management component 304 may include a container manager, such as when the virtual computing systems 306 are containers 312. In some implementations, the resource management component 304 executes within and/or in coordination with a host operating system 305.

A virtual computing system 306 includes a virtual environment that enables cloud-based execution of operations and/or processes described herein using the computing hardware 303. As shown, the virtual computing system 306 may include a virtual machine 311, a container 312, or a hybrid environment 313 that includes a virtual machine and a container, among other examples. The virtual computing system 306 may execute one or more applications using a file system that includes binary files, software libraries, and/or other resources required to execute applications on a guest operating system (e.g., within the virtual computing system 306) or the host operating system 305.

Although the assistant system 110 may include one or more elements 303-313 of the cloud computing system 302, may execute within the cloud computing system 302, and/or may be hosted within the cloud computing system 302, in some implementations, the assistant system 110 may not be cloud-based (e.g., may be implemented outside of a cloud computing system) or may be partially cloud-based. For example, the assistant system 110 may include one or more devices that are not part of the cloud computing system 302, such as the device 400 of FIG. 4, which may include a standalone server or another type of computing device. The assistant system 110 may perform one or more operations and/or processes described in more detail elsewhere herein.

The network 320 may include one or more wired and/or wireless networks. For example, the network 320 may include a cellular network (e.g., a fifth generation (5G) network, a fourth generation (4G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or a combination of these or other types of networks. The network 320 enables communication among the devices of environment 300.

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 may be implemented within a single device, or a single device shown in FIG. 3 may be implemented as multiple, distributed devices. Additionally, or alternatively, a set of devices (e.g., one or more devices) of the environment 300 may perform one or more functions described as being performed by another set of devices of the environment 300.

Figure 4:
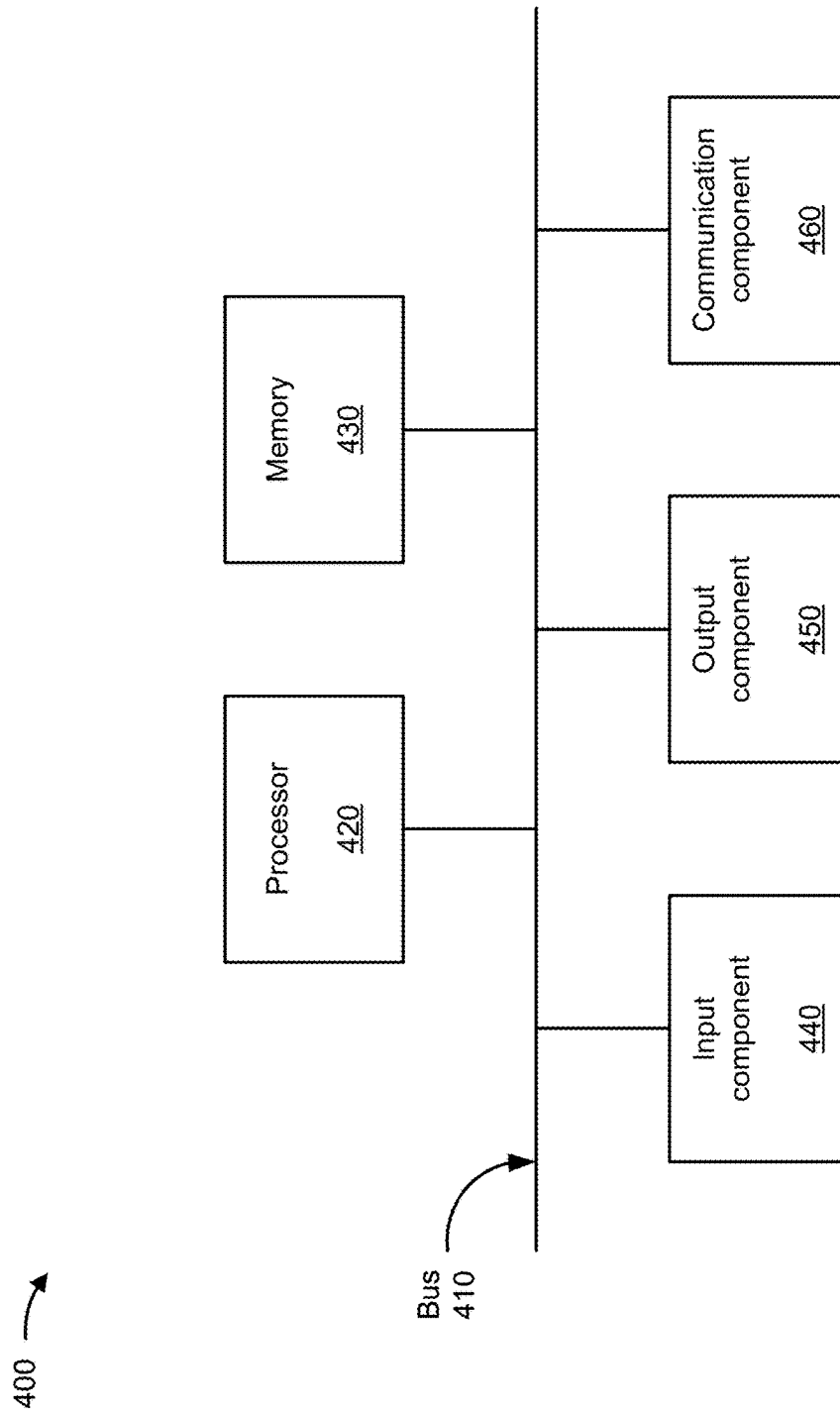
FIG. 4 is a diagram of example components of one or more devices of FIG. 3.

FIG. 4 is a diagram of example components of a device 400, which may correspond to the user device 105 and/or the assistant system 110. In some implementations, the user device 105 and/or the assistant system 110 may include one or more devices 400 and/or one or more components of the device 400. As shown in FIG. 4, the device 400 may include a bus 410, a processor 420, a memory 430, an input component 440, an output component 450, and a communication component 460.

The bus 410 includes one or more components that enable wired and/or wireless communication among the components of the device 400. The bus 410 may couple together two or more components of FIG. 4, such as via operative coupling, communicative coupling, electronic coupling, and/or electric coupling. The processor 420 includes a central processing unit, a graphics processing unit, a microprocessor, a controller, a microcontroller, a digital signal processor, a field-programmable gate array, an application-specific integrated circuit, and/or another type of processing component. The processor 420 is implemented in hardware, firmware, or a combination of hardware and software. In some implementations, the processor 420 includes one or more processors capable of being programmed to perform one or more operations or processes described elsewhere herein.

The memory 430 includes volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 stores information, instructions, and/or software (e.g., one or more software applications) related to the operation of the device 400. In some implementations, the memory 430 includes one or more memories that are coupled to one or more processors (e.g., the processor 420), such as via the bus 410.

The input component 440 enables the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 enables the device 400 to provide output, such as via a display, a speaker, and/or a light-emitting diode. The communication component 460 enables the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., the memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

FIG. 5 is a flowchart of an example process 500 for utilizing a machine learning model to determine an intent of a voice customer in real time. In some implementations, one or more process blocks of FIG. 5 may be performed by a device (e.g., the assistant system 110). In some implementations, one or more process blocks of FIG. 5 may be performed by another device or a group of devices separate from or including the device, such as a user device (e.g., the user device 105). Additionally, or alternatively, one or more process blocks of FIG. 5 may be performed by one or more components of the device 400, such as the processor 420, the memory 430, the input component 440, the output component 450, and/or the communication component 460.

As shown in FIG. 5, process 500 may include receiving real time audio data associated with a call between an agent and a customer (block 510). For example, the device may receive real time audio data associated with a call between an agent and a customer, as described above.

As further shown in FIG. 5, process 500 may include receiving customer data identifying historical interactions with the customer (block 520). For example, the device may receive customer data identifying historical interactions with the customer, as described above.

As further shown in FIG. 5, process 500 may include generating, based on the real time audio data, transcript data identifying a real time transcript of the call with the customer (block 530). For example, the device may generate, based on the real time audio data, transcript data identifying a real time transcript of the call with the customer, as described above. In some implementations, generating, based on the real time audio data, the transcript data identifying the real time transcript of the call with the customer comprises processing the real time audio data, with a real time speech analysis model, to generate the transcript data identifying the real time transcript of the call with the customer.

As further shown in FIG. 5, process 500 may include processing the real time audio data, the customer data, and the transcript data, with a machine learning model, to determine a customer intent and one or more actions to perform based on the customer intent (block 540). For example, the device may process the real time audio data, the customer data, and the transcript data, with a machine learning model, to determine a customer intent and one or more actions to perform based on the customer intent, as described above. In some implementations, the machine learning model is a natural language processing model.

As further shown in FIG. 5, process 500 may include performing the one or more actions (block 550). For example, the device may perform the one or more actions, as described above. In some implementations, performing the one or more actions includes generating a sentiment graph based on the customer intent, and providing the transcript data and the sentiment graph for display to the agent in real time. In some implementations, performing the one or more actions includes determining based on the customer intent that the customer wishes to complete a transaction, generating an in-line chat flow to complete the transaction with the customer, and providing the in-line chat flow for display to the agent.

In some implementations, performing the one or more actions includes determining based on the customer intent that the customer wishes to complete a transaction, identifying one or more applications to complete the transaction with the customer, and providing the agent with access to the one or more applications. In some implementations, performing the one or more actions includes determining based on the customer intent that the customer wishes to be provided one or more options for a product or a service, generating the one or more options for the product or the service, and providing the one or more options for display to the agent.

In some implementations, performing the one or more actions includes detecting, based on at least one of the real time audio data, the customer data, and the transcript data, a customer question, performing a search for an answer to the customer question, identifying a link for the answer to customer question, and providing the link for display to the agent. In some implementations, performing the one or more actions includes determining based on the customer intent that the customer requires a communication associated with a product or a service, automatically populating the communication with customer information to generate a populated communication, and providing the populated communication to the agent.

In some implementations, performing the one or more actions includes determining based on the customer intent that a customer greeting is warranted for the customer, generating the customer greeting, and providing the customer greeting for display to the agent. In some implementations, the customer greeting includes a reason for the call or a reason for a previous call with the customer. In some implementations, performing the one or more actions includes retraining the machine learning model based on the customer intent or results associated with performance of the one or more actions.

In some implementations, process 500 includes receiving chat data associated with the customer and IVR data associated with the customer, and processing the real time audio data, the customer data, and the transcript data, with the machine learning model, to determine the customer intent and the one or more actions includes processing the real time audio data, the customer data, the chat data, the IVR data, and the transcript data, with the machine learning model, to determine the customer intent and the one or more actions to perform based on the customer intent.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device;
real time audio data associated with a call between an agent of an entity and a customer,
customer data identifying historical transactions of the customer with the entity and historical transcripts of previous calls by the customer with the entity,
chat data identifying chat session input during one or more chat sessions with the customer, and
interactive voice response (IVR) data identifying IVR data input during one or more IVR sessions with the customer;
generating, by the device and based on the real time audio data, transcript data identifying a real time transcript of the call with the customer;
inputting, by the device and into a machine learning model, the customer data, the chat data, the IVR data, and the transcript data, to cause the machine learning model to output:
a customer intent,
wherein the customer intent includes at least one of:
an intent of the customer to purchase a product or service from the entity,
an intent of the customer to learn more about the product or service of the entity, or
an intent of the customer to receive support for the product or service of the entity, and
one or more actions to perform based on the customer intent; and
performing, by the device, the one or more actions.

2. The method of claim 1, wherein generating, based on the real time audio data, the transcript data identifying the real time transcript of the call with the customer comprises:
processing the real time audio data, with a real time speech analysis model, to generate the transcript data identifying the real time transcript of the call with the customer.

3. The method of claim 1, wherein the machine learning model is a natural language processing model.

4. The method of claim 1, wherein performing the one or more actions includes:
generating a sentiment graph based on the customer intent; and
providing the transcript data and the sentiment graph for display to the agent in real time.

5. The method of claim 1, wherein performing the one or more actions includes:
determining based on the customer intent that the customer wishes to complete a transaction;
generating an in-line chat flow to complete the transaction with the customer; and
providing the in-line chat flow for display to the agent.

6. The method of claim 1, wherein performing the one or more actions includes:
determining based on the customer intent that the customer wishes to complete a transaction;
identifying one or more applications to complete the transaction with the customer; and
providing the agent with access to the one or more applications.

7. A device, comprising:
one or more processors configured to:
receive:
real time audio data associated with a call between an agent of an entity and a customer,
customer data identifying historical transactions of the customer with the entity,
chat data identify chat session input during one or more chat sessions with the customer, and
interactive voice response (IVR) data identifying IVR data input during one or more IVR sessions with the customer;
process the real time audio data, with a real time speech analysis model, to generate transcript data identifying a real time transcript of the call with the customer;
input, into a machine learning model, the customer data, the chat data, the IVR data, and the transcript data to cause the machine learning model to output:
a customer intent,
wherein the customer intent includes at least one of:
an intent of the customer to purchase a product or service from the entity,
an intent of the customer to learn more about the product or service of the entity, or
an intent of the customer to receive support for the product or service of the entity, and
one or more actions to perform based on the customer intent; and
perform the one or more actions.

8. The device of claim 7, wherein the one or more processors, to perform the one or more actions, are configured to:
detect, based on at least one of the real time audio data, the customer data, and the transcript data, a customer question;
perform a search for an answer to the customer question;
identify a link for the answer to customer question; and
provide the link for display to the agent.

9. The device of claim 7, wherein the one or more processors, to perform the one or more actions, are configured to:
determine based on the customer intent that the customer wishes to be provided one or more options for the product or service;
generate the one or more options for the product or service; and
provide the one or more options for display to the agent.

10. The device of claim 7, wherein the one or more processors, to perform the one or more actions, are configured to:
determine based on the customer intent that the customer requires a communication associated with the product or service;
automatically populate the communication with customer information to generate a populated communication; and
provide the populated communication to the agent.

11. The device of claim 7, wherein the one or more processors, to perform the one or more actions, are configured to:
determine based on the customer intent that a customer greeting is warranted for the customer;
generate the customer greeting; and
provide the customer greeting for display to the agent.

12. The device of claim 11, wherein the customer greeting includes a reason for the call or a reason for a previous call with the customer.

13. The device of claim 7, wherein the one or more processors, to perform the one or more actions, are configured to:

retrain the machine learning model based on the customer intent or results associated with performance of the one or more actions.

14. A non-transitory computer-readable medium storing a set of instructions, the set of instructions comprising:
one or more instructions that, when executed by one or more processors of a device, cause the device to:
receive:
real time audio data associated with a call between an agent of an entity and a customer;
customer data identifying historical transcripts of previous calls by the customer with the entity,
chat data identifying chat session input during one or more chat sessions with the customer, and
interactive voice response (IVR) data identifying IVR data input during one or more IVR sessions with the customer;
generate, based on the real time audio data, transcript data identifying a real time transcript of the call with the customer;
input, into a machine learning model, the customer data, the chat data the IVR data, and the transcript data, to cause the machine learning model to output:
a customer intent,
wherein the customer intent includes at least one of:
an intent of the customer to purchase a product or service from the entity,
an intent of the customer to learn more about the product or service of the entity, or
an intent of the customer to receive support for the product or service of the entity, and
one or more actions to perform based on the customer intent; and
perform the one or more actions.

15. The non-transitory computer-readable medium of claim 14, wherein the one or more instructions, that cause the device to perform the one or more actions, cause the device to one or more of:
generate a sentiment graph based on the customer intent, and provide the transcript data and the sentiment graph for display to the agent in real time; or
determine based on the customer intent that the customer wishes to complete a transaction, generate an in-line chat flow to complete the transaction with the customer, and provide the in-line chat flow for display to the agent.

16. The non-transitory computer-readable medium of claim 14, wherein the one or more instructions, that cause the device to perform the one or more actions, cause the device to one or more of:

determine based on the customer intent that the customer wishes to complete a transaction, identify one or more applications to complete the transaction with the customer and provide the agent with access to the one or more applications; or detect, based on at least one of the real time audio data, the customer data, and the transcript data, a customer question, perform a search for an answer to the customer question, identify a link for the answer to customer question, and provide the link for display to the agent.

17. The non-transitory computer-readable medium of claim 14, wherein the one or more instructions, that cause the device to perform the one or more actions, cause the device to one or more of:
determine based on the customer intent that the customer wishes to be provided one or more options for the product or service, generate the one or more options for the product or the service, and provide the one or more options for display to the agent; or
determine based on the customer intent that the customer requires a communication associated with the product or service, automatically populate the communication with customer information to generate a populated communication, and provide the populated communication to the agent.

18. The non-transitory computer-readable medium of claim 14, wherein the one or more instructions, that cause the device to perform the one or more actions, cause the device to:
determine based on the customer intent that a customer greeting is warranted for the customer;
generate the customer greeting that includes a reason for the call or a reason for a previous call with the customer; and
provide the customer greeting for display to the agent.

19. The non-transitory computer-readable medium of claim 14, wherein the one or more instructions, that cause the device to perform the one or more actions, cause the device to:
retrain the machine learning model based on the customer intent or results associated with performance of the one or more actions.

20. The non-transitory computer-readable medium of claim 14, wherein the machine learning model is a natural language processing model.

* * * * *